United States Patent Office 3,384,745
Patented May 21, 1968

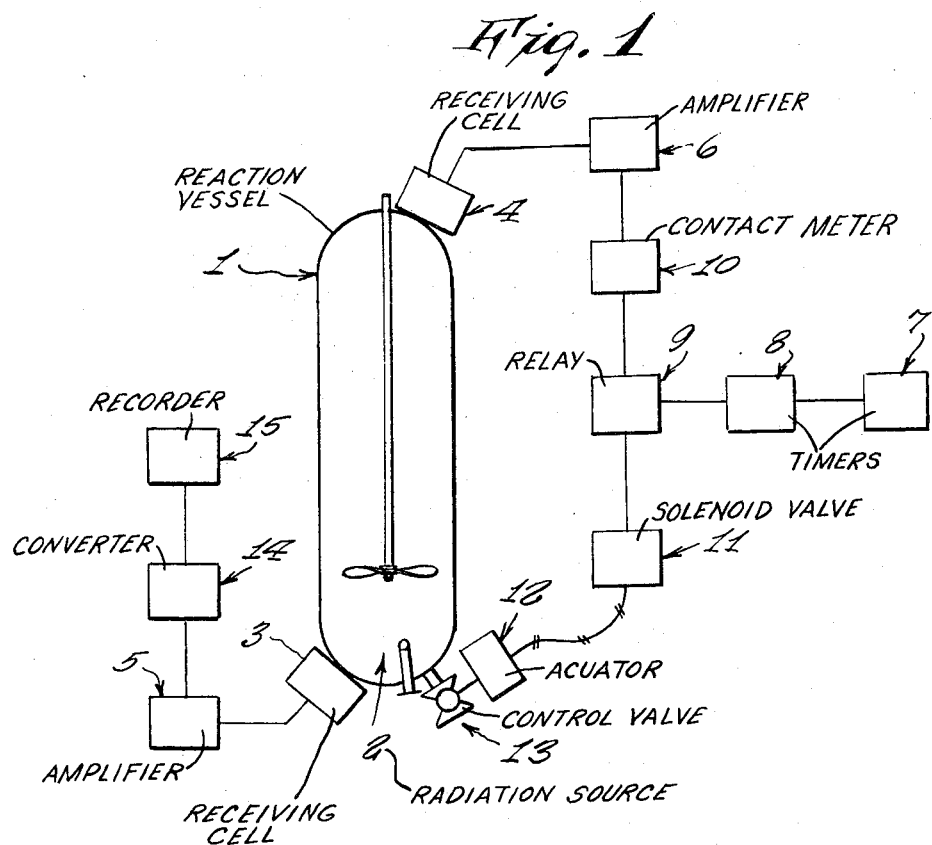

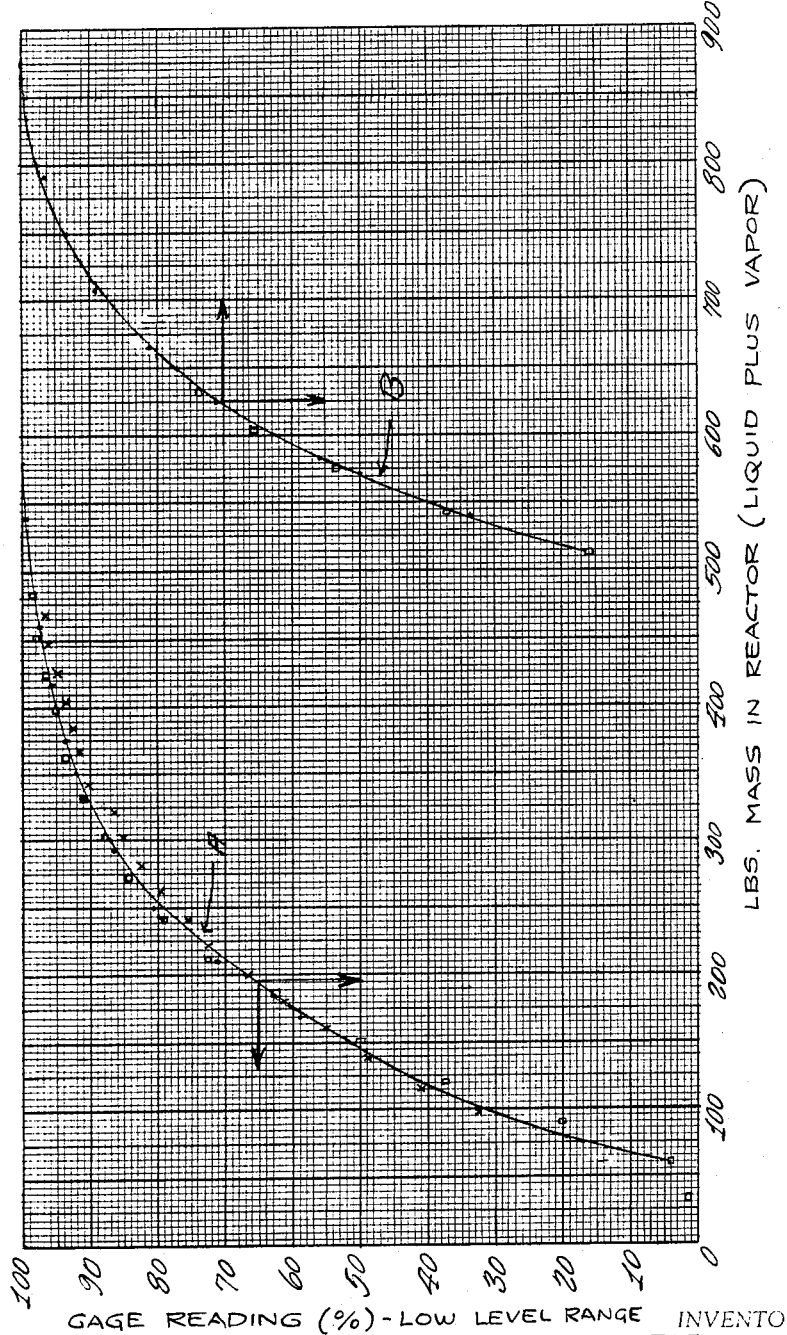

3,384,745
MASS CONTROL AND DENSITY MEASUREMENT SYSTEM FOR CHEMICAL REACTIONS
Joel Markowitz, Yonkers, N.Y., and Donald W. Fair, Odessa, Tex., assignors to Rexall Drug and Chemical Company, Los Angeles, Calif., a corporation of Delaware
Filed Feb. 17, 1964, Ser. No. 345,369
5 Claims. (Cl. 250—43.5)

This invention relates to a process for controlling a reaction mass in a chemical reaction system and to apparatus associated therewith. The invention particularly concerns a process for a continuous polymerization reaction wherein mass is continuously measured and controlled and density of the reaction system is continuously measured by the use of a radiation source and control instruments associated therewith.

Heretofore, it was known to effect certain measurements and controls of a chemical reaction such as a polymerization reaction by the use of radiation sources and control instruments, for example, the use of a radiation source to control the level of a reaction mass in a vessel. It was also known heretofore to measure density of a reaction mass by the use of a radiation beam and certain control instruments associated therewith. In particular, some systems have been proposed wherein both density and liquid level in a reactor could be measured by radiation sources placed adjacent to a reactor (including within the reactor) and certain detecting instruments which converted the radiated energy to electrical signals and thereby permitted exercise of control of liquid level of the reaction system in response to radiation signals, as well as measurement of density.

In systems of the type described above, specifically those wherein radiation sources for liquid level and for density were used in a reactor, there were certain problems encountered which made operation of such systems difficult to control. Thus, where both density and liquid level were measured via radiation beams, two radiation sources were usually required, one for liquid level control and the other for density. In systems of this nature, it became apparent that there was considerable radiation overlap with the two sources and that the radiation received by the liquid level detector in many instances emanated from both the liquid level and density radiation sources. This was particularly true in cases involving small commercial or semi-commercial reactors or those wherein the radiation sources were placed in such a position that this could occur. Where larger reactors are used, the system may very well operate without such radiation overlaps, but then elaborate control systems are required in order to obtain the required correlations between the two types of measurements. Measurement of liquid level per se, for example, is subject to various difficultly controllable problems in a polymerization system, such as coating of reactor walls and/or radiation source and receiver with a polymer; or interface phenomena such as fouling; or interface disturbance due to agitation or other reasons which thereby tend to result in certain misleading level readings due to inaccurate absorption measurements.

In any chemical reaction system with which the present invention is concerned, whether it be a solid phase, vapor phase, or solvent or diluent reaction system, there is involved at least two phases, one a gaseous phase and the other a non-gaseous phase. The gaseous and non-gaseous phases can involve vapors, liquids and solids, as will be set forth hereinafter.

In accordance with this invention, a new concept has been developed for the measurement and control of mass and the measurement of density in a reaction vessel. This concept is different from that of the prior art involving liquid level and density measurement or liquid level alone as will be understood from this specification.

It is an object of this invention to provide a novel process for measurement and control of a chemical reaction including a radiation and detection system.

It is a further object of this invention to provide a novel processing tool for polymerization reactions, specifically continuous polymerization reactions wherein mass is measured and controlled in conjunction with a radiant beam of energy and equipment associated therewith.

It is a still further object of this invention to provide a process for a continuous polymerization reaction for alpha-olefins involving a continuous measurement and control of mass and measurement of density or slurry concentration in a polymerization vessel.

Another object of this invention is the provision of apparatus for carrying out the foregoing process.

In accordance with this invention, there is provided an improvement in a method for carrying out a continuous reaction comprising continuously introducing at least one reactant to a reaction vessel and substantially continuously removing reaction mass from said vessel, said improvement including maintaining a reaction mass in said vessel for a predetermined residence time by measuring the intensity of a beam of radiation transmitted through a path which represents a cross-section of the total polymerization mass (and therefore includes all the phases present) in said vessel and converting said transmitted radiation beam to an electrical signal and discharging at least a portion of the reactants from said vessel in response to said signal. This invention further includes the transmission of a portion of the same radiation beam through at least a portion of the non-gaseous reaction phase, measuring the intensity of said second beam of radiation, converting said beam to an electrical signal, and converting said signal to a density reading. The invention further provides apparatus in combination, including a reaction vessel for a polymerization reaction mass associated with inlet and outlet means for the reactants therein; a single radiation source adjacent to said vessel, a first radiation signal detection means for detecting transmitted radiation through a cross-section of the reactants in said vessel, a second radiation signal detection means for measuring density of a portion of the total reactants in said vessel, means for converting said first detected radiation signal to electrical impulses or signals, means for using said signals to actuate a discharge valve and means for converting said second detected radiation signal to a reading proportional to the density of the non-gaseous phase (hereafter referred to as the "density reading").

FIGURES 1 and 2 of the attached drawings form a part of this specification and invention and are incorporated herein by reference. The figures represent apparatus for carrying out a polymerization reaction and associated control instruments and include also a graph illustrating curves A and B indicating mass measurements of various liquids.

For the purpose of clarification only when used in this specification, the following terms are intended to have the following meaning. By "reaction mass" is intended to mean all phases present in the reaction vessel, whether reactive or inert or liquid, solid or gas. A "polymerization mass" or "reactants" also is intended to mean the total mass in the vessel including active and inert liquids, gases and/or solids. By the term "a gaseous and non-gaseous phase" is intended to mean that the reaction mass exists in the reaction vessel in at least two phases, one being a vaporous or gaseous phase which includes reactive components and/or inert gases, while the non-gaseous phase includes a solid and/or a solids liquids phase.

By the term "cross-section" of the reaction mass is intended to mean any straight line path between radiation source and receiver or detector, such path crossing at least a portion of all phases present in the vessel. Thus, by this definition, a radiation source can be placed adjacent a vessel, meaning inside or outside, but preferably inside at a lower portion of the vessel or at any section of the vessel where the radiation beam path will cross at least a portion of the vessel which includes all phases present.

With specific reference to FIGURE 1 of the drawings, there is indicated at 1 a reaction vessel and at 2 a radiation source placed inside the vessel, which source can be a gamma radiation emitter such as Cobalt-60. In accordance with this invention only one source is needed for emission of radiation energy, thereby minimizing radiation overlaps, which may occur when using multiple radiation sources. The radioactive source emits gamma radiation which is emitted in all directions, but particularly toward radiation receiving cells or detectors 3 and 4. The radiation received at 3 and 4 with the vessel empty is a function of the distance, type and strength of source, walls, etc. and is constant. At mass, particularly in this case in the form of solids, liquids or gases is added to the vessel, the radiation received at 3 and 4 is reduced since the absorption of radiation is proportional to the mass through which the radiation passes. A change in radiation absorption due to a change in mass within the vessel is sensed by the receiving cells 3 and 4 which convert said radiation energy to electrical energy or signals resulting in a current. The current developed by the radiation is amplified by amplifiers 5 and 6. A zero to 100% readout for the various ranges of mass and density results. Units 14 and 15 are used to obtain a pneumatically operated record of the density. Thus, current from receiving cell 3 is amplified in amplifier 5 and converted in converter 14 from an electrical input to a pneumatic output as indicated in the drawing (an electric to pneumatic transducer). Instrument 15 is therefore a pneumatic recorder which has been calibrated to record density as will be explained hereinafter. If desired, an electrically operated recorder can be used instead of an electric to pneumatic transducer for this purpose.

The mass measurement in accordance with this invention is initiated by the measurement of radiation in receiving cell 4, which converts the radiation received to an electrical signal. The electrical signal is sent to contact meter 10 from amplifier 6, the contact meter being provided with a 0 to 100% readout and being adjusted or set at any desired reading between 0 to 100%. Assuming a setting for this contact meter of X pounds of mass in the vessel, when the mass in the vessel exceeds the mass desired, the signal generated by this change in mass exceeds the value of the setting on contact meter 10 and the meter contacts close. An override (not shown) on the contact meter to the timeclock system (explained below) permits the completion of a circuit between the relay 9 and solenoid valve 11. When the mass drops below the contact meter setting, the contact opens. Since the process is applicable to a continuous operation, this procedure is repeated continuously as long as a reactant or reactants is being fed to the vessel. In operation, timeclock 7 sets the frequency at which control valve 13 may cycle. Timeclock 7 energizes timeclock 8 which controls the duration of valve movement (closed to open to start of closing cycle). It does this by sending an electrical signal to solenoid valve 11 through the relay 9. The control valve (a plug valve or any other suitable valve) 13 is furnished with a pneumatic cylinder valve actuator 12 (or other suitable means of valve actuation) which opens and closes the valve according to the signals received from relay 9. In this manner, the mass removed from the vessel each time the valve is operated is controlled. In order to increase the discharge rate, the valve can be "pulsed" more frequently or the "open" time increased. It will be noted that small frequency pulses emulate continuous, or substantially continuous, discharge from the reactor which is desirable. Thus, by controlling the mass in vessel 1 the residence time is therefore controlled very accurately. Residence time is defined as $$\frac{\text{lbs. (mass) in vessel}}{\text{lbs. (mass) discharged per unit time}}$$

It is to be noted that if a level (liquid level) measuring means were used, in order to obtain any useful information from any such measurement, the step of converting level to mass would be required and this would require knowing the density. As is known, however, in reaction systems such as polymerization reactions, the density can vary because of temperature, reaction rate, degree of agitation or concentration changes, and corrections would have to be measured or estimated and the controlled level corrected to maintain a constant residence time. Thus, the process of this invention simply controls the total mass in the vessel and it is immaterial to this system whether it is solid, liquid or gaseous. Density measurement or readings from the density meter gage can be used to determine the percent solids or slurry concentration, as will be explained further below.

Briefly then, FIGURE 1 illustrates for density and mass measurements a system comprising a radiation source 2 such as cesium or cobalt (which emits gamma radiation) located inside vessel 1 and preferably placed so that radiation from it traverses, first with respect to density measurements to be made, a cross-section of the non-gaseous phase, that is, a solids-liquids phase in polymerization reactions such as those involving polyethylene or polypropylene (for mass measurement the radiation traverses all phases which comprise the total mass). A gamma ray emitted from source 2 will thus traverse, first prior to polymerization, a liquid and then after initiation of polymerization, a slurry of olefin, or diluent, or both and polymer solids dispersed therein. For density measurement purposes, a detector or receiving cell 3 is placed outside and adjacent the vessel in a suitable location so that the radiation received from source 2 will have traversed the slurry therein, that is, a cross-section of the liquids-solids contents whose density is to be measured in this case. Receiving cell 3 (and 4) can suitably be a Geiger counter or cells such as described in U.S. Patents 2,737,592 and 2,964,628 which convert radiation signals to electrical signals or current. The current generated in 3 is suitably amplified in an amplifier (a standard instrument) 5 and fed to converter 14 which is an electrical signal input, pneumatic output type instrument (a transducer such as a Taylor transducer). As noted previously, however, an electrically operated recorder can be used equally as well. Instrument 15, a pneumatic recorder operatively responsive to converter 14 records density of the slurry. Instrument 15, in effect a density gage, can be calibrated for various density ranges in specific gravity units such as from 0.1 to 1.0 or intermediately such as from 0.3 to 0.8 specific gravity units. Density readings can be correlated to percent solids concentration of the slurry (the ultimate information usually desired in a polyolefin polymerization reaction). Thus, knowing the percent solids in the reactor, it may be desirable to increase or decrease this percent such as from 20% to 25% total solids, and this can be accomplished, at least in one instance, by varying the residence time of the reactants, for example, by raising the mass set point of contact meter 10.

The mass control of reactor contents begins by measuring a beam of transmitted radiation from source 2. The transmitted beam is received in receiving cell 4 which can be similar to cell 3 and is converted to current. The current is amplified at 6 (a standard amplifier), and then fed to contact meter 10 (a suitable meter being a commercial Larson meter). The amount of radiation received at 4 and therefore the amount of current generated is a function of or varies with the mass of the material in the vessel which in an alpha-olefin polymerization reaction involves liquid, solids and vapor. Contact meter 10 can therefore be calibrated for mass readings of 0 to, for example, 1,000 pounds or higher by taking various readings of various masses in the reaction vessel. For the higher readings, it may be desirable to amplify the accuracy of the meter readings by expanding the final unit readings of the scale to a full 100% for the higher mass ranges. Having calibrated the contact meter for the mass content range in the reactor, it can then be set to a desired set point. After this setting, the operation of the system proceeds as follows. As indicated in FIGURE 1, there is provided a master timeclock 7 and a slave timeclock 8. These are manually set timers and run constantly regardless of whether the mass in the reactor is greater or less than the set point. Relay 9 is electrically connected to the timers 7 and 8 as indicated and functions to operatively energize a solenoid (a standard 3-way solenoid valve) valve (electrical signal input, pneumatic signal output) 11. In operation, when the mass in the reactor is greater than the set point of meter 10, an override to the timeclock system as explained previously, completes a circuit between relay 9 and solenoid valve 11 which in turn operates pneumatic cylinder operator 12 to open control valve 13 thereby discharging mass from the reactor. Actually, the whole mass control system is just an override on the system comprising the timers, solenoid, actuator and control valve. Contact meter 10 serves a relay in the circuit between the timers and the solenoid. Only when the meter 10 is closed (high mass in the vessel) is the circuit between the timers and the solenoid capable of being actuated. When the control valve opens, it does so for a pre-set period (usually one-half to a few seconds) and will do this as often as its "open" period is reached. If the mass in the reactor is less than the set point of meter 10, the circuit is open and the control valve 12 does not stroke because the solenoid valve 11 is not energized. Thus, the mass (residence time) of the reactor is controlled by opening and closing (cycling) valve 13 on the reactor discharge in response to signals from the solenoid, relay and timeclock system associated with contact meter 10. It should be noted that if the "valve closed time" is too long or the "open time" too short for the total feed rate to the vessel, then residence time cannot be accurately controlled. It is necessary, therefore, that the cycles (open and closed) be manually set to empty the vessel at a faster rate than it is fed (that is, during the total cycle) so that the control will work properly.

FIGURE 2, Curve A, illustrates mass reading in pounds of mass in reactor (liquid plus vapor) vs. gage readings in percentage points obtained on meter 10 using singly the systems water, heptane and propylene as indicated on the graph. As illustrated, the data are independent of the material in the vessel (also independent of level), being only a function of mass. Curve A, in conjunction with Curve B, further illustrates that the sensitivity of the measurements can be increased by calibrating the instrument 10 for low and high readings, for example, 0 to 300 pounds for Curve A and about 400 to 900 pounds for Curve B to obtain a more accurate indication of the mass contents of the reactor at the low and high readings.

As radioactive sources, there are numerous systems available, for example, Cesium-137, Cobalt-60, etc. of strengths from 25 to 500 millicuries or higher. The radiation receiving cells which convert radiation energy to electrical current as heretofore indicated can be any well known device such as a Geiger counter, etc. All instrumentation indicated in FIGURE 1 is well known. Electrical tie-ups, leads, etc., are not shown in the drawings, as these are all standard.

*Example*

To demonstrate the workings of the foregoing system and with further reference to FIGURE 1, a 30% polymer solids in heptane is prepared in a continuous polymerization system involving ethylene. A reactor of 2000 pounds capacity is provided and this contains 300 pounds of ethylene polymer and 700 pounds of heptane diluent, unreacted ethylene and heptane vapors for a 1000 pound total mass in the reactor. Radiation source 2 transmits a beam through a cross-section of the reaction mass. The beam travels through the slurry which involves solids, liquid, and possibly unreacted ethylene, and through the vapor zone and arrives at receiving cell 4 where it is detected and converted to an electrical current. The contact meter 10 is set to maintain 1000 pounds of total reactant mass in the vessel. Since ethylene and heptane diluent are continuously introduced to reactor 1, the mass exceeds 1000 pounds in the reactor and this closes contact meter 10 as indicated heretofore, thereby permitting the completion of a circuit between timeclocks 7, 8 and relay 9 to solenoid 11 to operatively open valve 13 by actuation of pneumatic cylinder operator 12. When the mass drops below 1000 due to opening of valve 13, signals from instruments 4 and 6 will open contact meter 10, thereby breaking the circuit that actuates valve 13. Valve 13 is previously set to pulse for a few seconds, for example, in response to the timeclocks. By this mechanism, therefore, the total mass and the residence time of the reaction mass is controlled. Density readings are obtained from calibrated pneumatic recorder 15 and these are correlated to percent solids in the reactor. This system is obviously applicable to other alpha-olefin polymerization reactions, for example, propylene, butene-1, that is, olefins containing from 2 to 8 carbon atoms or higher or copolymers thereof. These polymerization reactions can be carried out using the well known Ziegler-Natta catalysts such as titanium halides with aluminum alkyls. Having thus described this invention with specific reference to the drawings, it will be understood that changes in instrumentation, etc. can be made without departing from the true scope thereof.

What is claimed is:

1. In a method for carrying out a continuous polymerization reaction comprising continuously introducing at least one reactant to a substantially vertical vessel and substantially continuously removing the polymerization reaction mass from said vessel, the improvement for controlling the residence time of said polymerization reactant mass in said vessel by maintaining said reaction mass in said vessel for a predetermined time, which comprises transmitting a beam of gamma radiation through said reaction mass, the path of said beam of gamma radiation representing the entire length and cross-section of the total polymerization mass including a gaseous and a non-gaseous phase in said vessel, measuring the intensity of said transmitted beam of radiation, converting said transmitted radiation beam to an electrical signal and discharging at least a portion of said polymerization reaction mass from said vessel in response to said electrical signal.

2. The process of claim 1 wherein the continuous reaction is an olefin polymerization reaction.

3. In a method for carrying out a continuous polymerization reaction comprising continuously introducing at least one reactant to a substantially vertical reaction vessel and substantially continuously removing a portion of the polymerization reaction mass from said vessel, wherein said polymerization reaction mass includes a gaseous and a non-gaseous phase, the improvement which comprises continuously determining density of the non-gaseous phase and continuously controlling the residence time of said polymerization reaction mass in said vessel using a single source of gamma radiation, by measuring the intensity of a first beam of gamma radiation transmitted through at least a portion of said non-gaseous phase in said polymerization reaction mass, measuring the intensity of a second beam of gamma radiation transmitted through the entire length and path which represents a cross-section of the total polymerization mass in said vessel, separately converting said measured radiation beam to a first and second electrical signal, converting said first signal to a density reading, actuating a discharge valve with said second signal, and discharging from said vessel through said discharge valve at least a portion of said polymerization reaction mass to control its residence time.

4. The process of claim 3 wherein the continuous reaction is an olefin polymerization reaction.

5. In a polymerization process comprising continuously introducing an alpha-olefin to a substantially vertical vessel and substantially continuously withdrawing a polymer slurry therefrom, the improvement which comprises continuously measuring the density of the reaction mass including a gaseous and a non-gaseous phase in said reaction vessel and continuously measuring and controlling said reaction mass therein using a single source of gamma radiation by measuring the intensity of a first beam of gamma radiation transmitted through the entire length and cross-section of the reactants whose density is to be determined, measuring the intensity of a second beam of gamma radiation transmitted through the entire length and cross-section of the total reaction mass in said reaction vessel, separately converting said measured radiation beam to a first and second electrical signal, converting said first signal to a density reading, and continuously discharging from said reaction zone a portion of said reactants in response to said second signal.

References Cited

UNITED STATES PATENTS

| | | | |
|---|---|---|---|
| 2,456,233 | 12/1948 | Wolf | 250—43.5 |
| 2,713,124 | 7/1955 | Graham | 250—43.5 |
| 2,763,790 | 9/1956 | Ohmart | 250—43.5 |
| 2,765,410 | 10/1956 | Herzog | 250—43.5 |
| 2,953,682 | 9/1960 | Frank et al. | 250—43.5 |
| 3,000,854 | 9/1961 | Favre | 250—43.5 X |
| 3,011,662 | 12/1961 | Daily | 250—43.5 |
| 3,204,097 | 8/1965 | Moffat et al. | 250—43.5 |

RALPH G. NILSON, *Primary Examiner.*

S. ELBAUM, *Assistant Examiner.*